Nov. 14, 1933.    J. F. NELSON    1,935,481
DENTAL MATRIX
Filed July 21, 1932
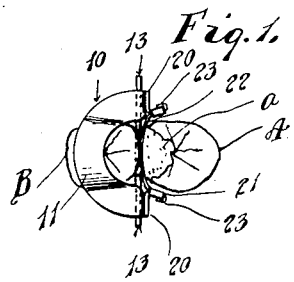
Fig. 1.
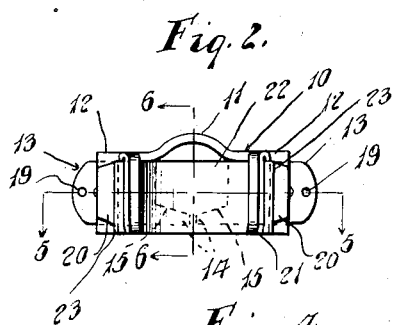
Fig. 2.
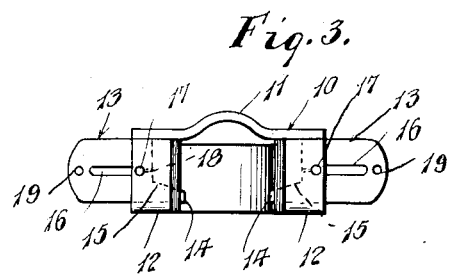
Fig. 3.
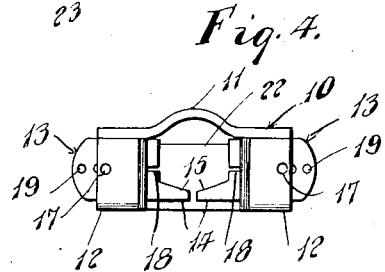
Fig. 4.
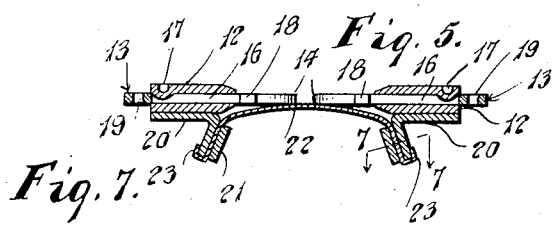
Fig. 5.
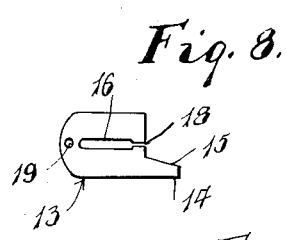
Fig. 8.
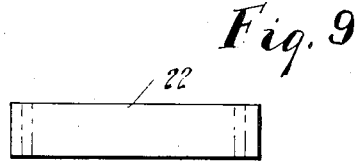
Fig. 7.
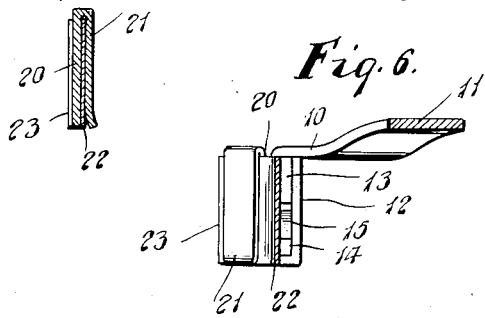
Fig. 6.
Fig. 9
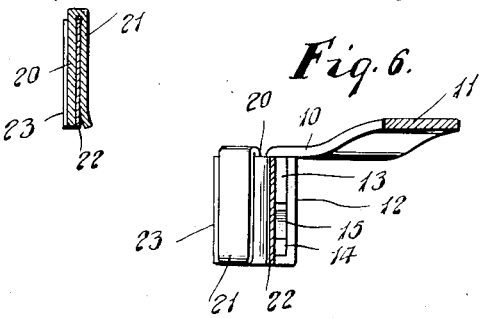
Inventor
J. F. Nelson,
By [signature]
Attorney Patented Nov. 14, 1933

1,935,481

UNITED STATES PATENT OFFICE 1,935,481

DENTAL MATRIX

Joseph F. Nelson, Parsons, Kans.

Application July 21, 1932. Serial No. 623,863

11 Claims. (Cl. 32—17)

The invention relates to dentistry and has particular reference to matrices used for forming with the walls of an interproximal cavity in the tooth a wall to permit filling of the cavity conveniently and to prevent the filling squeezing into the space between the tooth operated on and the adjacent tooth.

Heretofore it has been the practice to provide a band of steel or other suitable metal that is either clinched around the tooth to be operated on or held in position by means of a screw clamp on which is mounted wedges to engage between the teeth, which is uncomfortable and in some instances painful to the subject and which entails more time and difficulty in adjusting because of the fact that the band is separate from the retaining clamp.

This invention has for its object the provision of a matrix for interproximal cavities that may be used with a minimum discomfort to the subject and that is extremely low in cost and very durable.

A further object of the invention is the provision of a dental matrix that is universal in its application, being capable of use in all positions in the mouth, except the six anterior teeth above and below, dispensing with the necessity of a collection of sizes, and that can be quickly and easily placed in position and removed.

The invention will be described in detail hereinafter and will be found illustrated in the accompanying drawing, in which Figure 1 is a top plan view of the improved dental matrix showing it in position between two molar teeth, Figure 2 is a side view in elevation, Figure 3 is a similar view of the opposite side of the matrix showing the wedges in their outermost positions, Figure 4 is a similar view showing the wedge members in their innermost or clamping positions, Figure 5 is a sectional view of a slightly enlarged scale on a plane indicated by the line 5—5 of Figure 2, Figure 6 is a sectional view on a plane indicated by the line 6—6 of Figure 2, Figure 7 is a sectional detail view on a plane indicated by the line 7—7 of Figure 5, Figure 8 is a view in elevation of one of the wedge members, and Figure 9 is a view in elevation of the matrix band.

In the drawing similar reference characters are used to designate corresponding parts in all the views.

The improved dental matrix as shown in the drawing includes a frame having an arcuate shaped horizontal bar 10 with its intermediate portion offset inwardly as shown at 11, and vertically arranged and spaced tubular guides 12 in which are slidably mounted wedge members 13 having their inner adjacent ends reduced and forming forwardly projected prongs 14 having their upper edges inclined downwardly and outwardly thereof as shown at 15. The bar 10 is adapted to seat on the tooth adjacent to the tooth that is to be operated on as shown in Figure 1, and the upwardly offset portion 11 is provided for convenience in placing and removing the same. In Figure 1 the tooth A is shown to be provided with an interproximal cavity $a$ and B designates the adjacent tooth. The wedges 13 are provided with longitudinal slots 16 to receive studs or projections on the tubular guide members, designated 17, that provide means for limiting the sliding movement of the wedges 13, said studs or projections may be formed by indenting the material of the guide members, as shown in the drawing, or any other provision of studs or projections may be substituted therefor as may be apparent. The wedges are also provided with slots 18 connecting the outer forward edge of the wedge member with the slots in each instance, thus providing a bifurcated wedge structure, and as the furcations formed by this structure are tensioned to normally spring outwardly, the upper and lower edges of the wedge members frictionally engage the upper and lower walls of the guide members 12 and serve to hold the wedges frictionally in adjusted positions against accidental displacement. The outer portion of each wedge 13 is also provided with an opening 19 to receive a pointed instrument for convenience in adjusting the position of the wedges either in placing or removing the matrix.

Secured to or formed integral with each of the guide members 12 is an arm 20 that is arranged at an angle to the guide member in each instance, and having a tongue 21 returned on said arm and spaced therefrom to receive the ends of a matrix band 22 therebetween, said band having its ends bent and returned to engage the outer edges of the arm 20 on each side of the frame as shown at 23. By providing the arms 20 at angles to the guide members 12 it will be apparent that the band 22, which is made of a thin strip of steel is shaped by the positions of said arms to approximate the contour of the tooth.

The arm 20 with the returned tongue 21 forms a tensioned clip which holds the matrix band 22 securely and provides a means for removal and replacement of matrix bands and thereby enables the operator to use bands of different widths and to replace an old band with a new one.

In use it will be apparent that the device is inserted so that the concaved portion of the band 22 engages the side of the tooth to be filled, the wedge members 13 being withdrawn outwardly in the position shown in Figure 3. After the band and the device is in position wedge members 13 are moved inwardly toward one another approximating the position shown in Figure 4, and the adjacent edges of the wedge members 13 engage the band 22 to hold it in engagement with the side of a tooth, and the pointed extensions 14 serve not only to hold the band in engagement with the side of the tooth, but also to prevent accidental displacement of the device while in position. The band when in position as shown in Figure 1 provides with the walls of the cavity in the tooth a matrix to receive the filling and prevents the filling from squeezing out into the soft gum tissues between the teeth and at the same time enables a thorough packing of the filling material without discomfort to the subject.

I desire to emphasize that various minor changes in details of construction, proportion and arrangement of parts may be resorted to, when required without sacrificing any of the advantages of my invention as set forth.

What is claimed is:—

1. A dental matrix, comprising a frame, wedge members slidably mounted in said frame, a matrix band engaging said wedge members, and means on said frame to retain said band in position therein.

2. A dental matrix, comprising a frame having tubular guide-ways, wedge members slidably mounted in said guide-ways, means limiting the movements of said wedges, a matrix band, and means on said frame to retain said band in position therein.

3. A dental matrix, comprising a frame having tubular guide-ways, wedge members slidably mounted in said guide-ways, said wedges being bifurcated and having the furcations under tension and in engagement with opposite walls of said guide-ways providing a binding action therewith, a matrix band, and means on said frame to retain said band in position therein.

4. A dental matrix, comprising a frame having tubular guide-ways, wedges slidably mounted on said guide-ways and having slots therein, projections in said guide-ways engaging in said slots to limit the movements of the wedges, a matrix band, and means on said frame to retain said band in position therein.

5. A dental matrix, comprising a frame, wedge members slidably mounted in said frame, the frame including bifurcated supporting members, and a matrix band mounted in said supporting members and cooperating with said wedges.

6. A dental matrix, comprising a frame, wedge members slidably mounted in said frame, the frame including bifurcated supporting members arranged at an angle to said wedges, and a matrix band mounted in said supporting members and cooperating with said wedges.

7. A dental matrix, comprising a frame, wedge members slidably mounted in said frame, the frame including arms extending at an angle to said wedges, tongues on said arms rebent thereon and spaced therefrom to provide supports, and a matrix band mounted in said supports and cooperating with said wedges.

8. A dental matrix, comprising a frame, wedge members slidably mounted in said frame, tubular guide-ways mounting said wedge members, the wedge members bifurcated and having furcations under tension to frictionally engage opposite walls of said guide-ways, projections in said tubular members engaging between said furcations to limit the movement of said wedge members, said frame including arms arranged at an angle to said guide-ways, tongues on said arms rebent thereon and spaced therefrom, and a matrix band mounted between the arms and tongues and cooperating with said wedges.

9. A dental matrix, comprising a frame provided with a horizontal bar, and including guide-ways, wedge members slidably mounted in said guide-ways, supporting members angularly arranged relatively to said guide-ways, and a removable matrix band mounted in said supporting members and engageable by said wedge members in one of their positions.

10. A dental matrix, comprising a frame provided with a horizontal bar having an upwardly offset portion intermediate of its ends, guide-ways mounted on said bar, wedge members slidably mounted in said guide-ways, supporting members angularly arranged relatively to said guide-ways, and a removable matrix band mounted in said supporting members and engageable by said wedge members in one of their positions.

11. A dental matrix, comprising a frame provided with an arcuate horizontal bar having an upwardly offset portion intermediate of its ends, guide-ways mounted on said bar, wedge members slidably mounted in said guide-ways, supporting members angularly arranged relatively to said guide-ways, and a removable matrix band mounted in said supporting members and engageable by said wedge members in one of their positions.

JOSEPH F. NELSON.